Feb. 2, 1932.　　　C. COLLIFLOWER　　　1,843,109
BATTERY TERMINAL AND SEAL
Filed Aug. 31, 1928
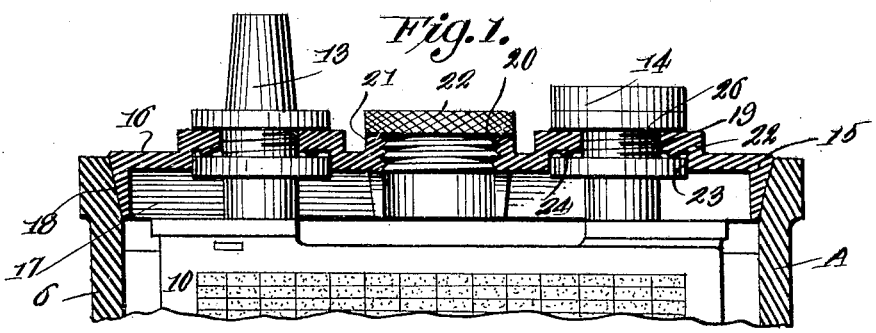
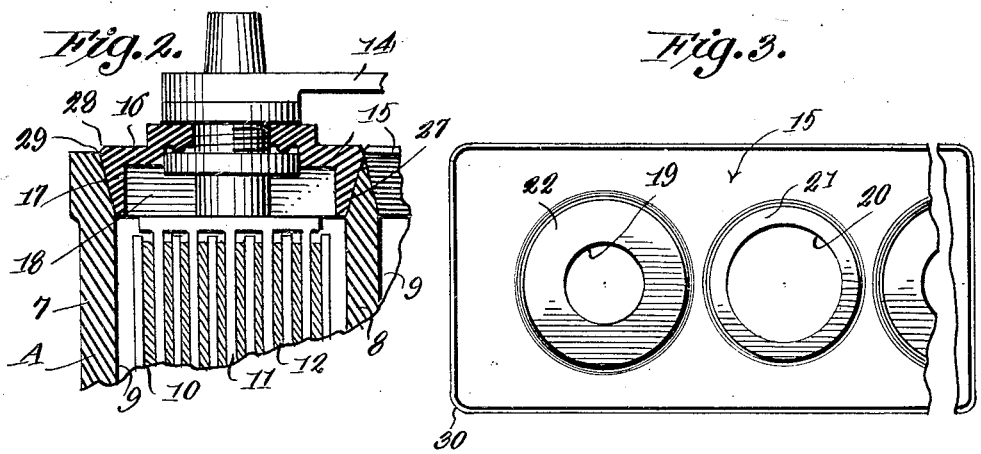
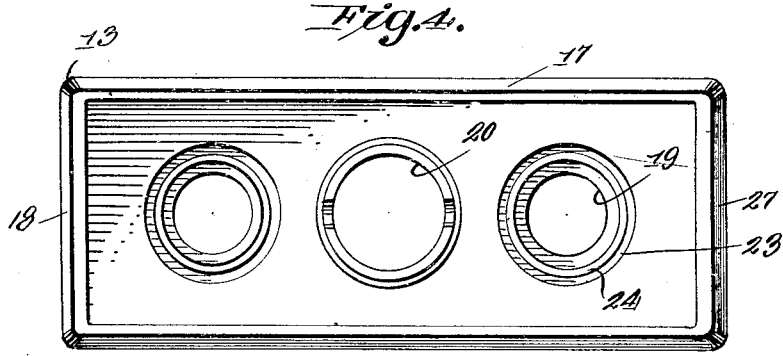
WITNESS.
Guy M Spring
INVENTOR.
CHESTER COLLIFLOWER.
BY
Irving L. McCathran
ATTORNEY.

Patented Feb. 2, 1932

1,843,109

UNITED STATES PATENT OFFICE

CHESTER COLLIFLOWER, OF TERRE HAUTE, INDIANA

BATTERY TERMINAL AND SEAL

Application filed August 31, 1928. Serial No. 303,331.

This invention relates to storage batteries and more particularly to a novel cover for the battery case or jar, and is an improvement on application Serial #246,784, filed January 14, 1928, entitled Storage battery. The said application has now matured into Patent No. 1,720,057, dated July 16, 1929.

An important object of the present invention is to provide a self-sealing battery jar cover having rounded corners as well as beveled sides for assuring a fluid tight joint at the corners of the battery.

A further object of the invention is the provision of novel bosses formed on the jar cover for receiving the terminals of the battery cells whereby a leak proof joint will be had at said terminals and whereby the terminals will be held firmly in position.

A still further object of the invention is to provide a battery cell jar cover of the above character, which will be durable and efficient in use, one that will be simple and easy to manufacture and one which can be placed upon the market and incorporated with a conventional battery at a very low cost.

With these and other objects in view, the invention consists in the novel construction, arrangement and formation of parts, as will be hereinafter more fully described, claimed and illustrated in the accompanying drawings, in which drawings:—

Figure 1 is a transverse section through a battery jar or case showing the improved cover associated therewith, the cover being also shown in section.

Figure 2 is a fragmentary longitudinal section through a battery case with the cell covers in position, one of the covers being shown in transverse section.

Figure 3 is a top plan view of one of the novel covers, and

Figure 4 is a bottom plan view thereof.

Referring to the drawings in detail, wherein similar reference characters designate corresponding parts throughout the several views, the letter A generally indicates a complete storage battery, which comprises a battery box or casing 5 which can be formed of any desired material, such as rubber or rubber composition. The casing 5 includes the side walls 6 and the end walls 7 and equi-distantly spaced transversely extending partition walls 8 which form a plurality of independent cell compartments 9.

Each cell 9 has arranged therein the usual positive and negative plates, as indicated by the reference characters 10 and 11 and separators 12. The plates are provided with the usual terminal posts, certain of which can be fastened together by straps 13, the end cells having the opposite positive and negative posts left bare for the reception of lead wires.

A cover 15 is provided for each cell 9 and these covers form the salient feature of the invention. While I have shown the novel covers 15 associated with a battery having the cells thereof formed directly in the battery case, it is to be understood that independent cell jars can be used and inserted in a suitable protecting box or case.

The covers 15 are preferably formed of rubber or a composition of rubber and each include a flat rectangular shaped top wall 16 and depending side and end walls or flanges 17 and 18.

The top wall 16 is provided with side openings 19, through which the posts of the cells are adapted to protrude and a central opening 20 for permitting the introduction of water or electrolite in the cells. The central opening can be provided with any type of integral sleeve or hollow boss 21 which is internally threaded for the reception of a closing plug 22.

Attention is directed to the openings 19 formed in the top wall 16 for the reception of the terminals of the cells, and it is to be noted that these openings are formed in the central portion of suitable bosses 22 and the lower faces of the bosses are undercut or rabbeted as at 23 for a purpose which will be described.

The upper wall of the undercut portions can be provided with a rib 24 which is spaced from the opening 19 and a collar 25 formed on or secured to posts of the cells is adapted to fit against said rib, in order to form a leak-proof joint. In accordance with the invention I prefer to have the terminal posts threaded for the reception of a suitable nut or internally threaded washers 26 whereby the collar 25 and the washer 26 can be drawn into contact with the rib 24 and the top of the boss 22 respectively. As clearly shown in Figures 1 and 2, the collar 25 is received within the rabbeted portion and snugly engages the side wall thereof. This forms a leak-proof joint and also insures the taut holding of the posts in position.

The formation of the end walls 18 and the side walls 17 is important and it is to be noted that these walls are beveled inwardly and downwardly as indicated by the reference character 27. The beveled portion of these walls constitute the main portion thereof, but the extreme upper outer edge of the cover is beveled upwardly and inwardly as indicated by the reference character 28, and a sharp shoulder or edge 29 is formed at the meeting point of the beveled portions 27 and 28.

It is to be noted that the meeting point of the side and end walls 17 and 18 are rounded so as to provide a well rounded corner 30 which forms means for insuring a proper fit to be had between the corners of the cover and the covers of the cells or jars.

In use of the improved covers the same are forced directly into the cells and the beveled faces of the walls 17 and 18 permit the forcible insertion thereof into the cells, and the covers function similar to a stopper or cork. Thus a liquid and air tight connection is had between the walls of the cells and the cover, entirely eliminating the necessity of using sealing compounds or the like. The change of temperature in the cells, casing, or covers, will have no effect on the closures made and the possibility of electrolite seeping past the covers is entirely eliminated.

Further the edges 29 are adapted to engage one another when all of the covers of the cells are in position thus forming a secondary lock.

From the foregoing description, it can be seen that a novel cover for storage battery cells, jars, or boxes has been provided which will be self-locking and which will form an efficient brace for the upper ends of the cells.

Changes in details may be made without departing from the spirit or the scope of the invention, but:—

What I claim as new is:

In a storage battery, a cell including a jar, a cover for the jar having an apertured boss, a plate in said jar, a terminal on said plate extending through the apertured boss, the lower face of said boss around the aperture being rabbeted defining a side wall and an upper wall, an annular rib on said upper wall in spaced relation to the aperture and said side wall, a shoulder on said terminal snugly fitted in the rabbeted portion and engaging the rib and side wall, and a member fitted on the terminal engaging the upper face of the boss.

In testimony whereof I affix my signature.

CHESTER COLLIFLOWER.